United States Patent

Arima et al.

[11] Patent Number: 6,122,842
[45] Date of Patent: Sep. 26, 2000

[54] PARTICLE MOVEMENT AMOUNT CONTROLLER FOR FLUIDIZED BEDS

[75] Inventors: Kenichi Arima; Kenji Tagashira; Isao Torii; Kazuyuki Myoyo, all of Nagasaki; Yoshihisa Arakawa, Tokyo, all of Japan

[73] Assignee: Mitsubishi Heavy Industries, Ltd., Tokyo, Japan

[21] Appl. No.: 09/127,260

[22] Filed: Jul. 31, 1998

[30] Foreign Application Priority Data

Aug. 4, 1997 [JP] Japan .................................. 9-208797

[51] Int. Cl.⁷ ............................................. F26B 17/00
[52] U.S. Cl. ............................. 34/582; 34/585; 34/589
[58] Field of Search ......................... 165/104.16; 34/359, 34/360, 361, 362, 363, 365–375, 376–594, 10, 82; 432/15, 58; 110/245, 347; 431/170, 7; 239/600; 422/143, 142

[56] References Cited

U.S. PATENT DOCUMENTS

| | | | |
|---|---|---|---|
| 4,035,152 | 7/1977 | Yang et al. ........................... | 23/284 |
| 4,165,040 | 8/1979 | Beacham et al. ..................... | 239/600 |
| 4,295,817 | 10/1981 | Caplin et al. ......................... | 431/7 |
| 4,297,321 | 10/1981 | Beranek ................................ | 422/143 |
| 4,349,969 | 9/1982 | Stewart et al. ........................ | 34/57 A |
| 4,517,162 | 5/1985 | Moss ..................................... | 422/142 |
| 4,574,496 | 3/1986 | Sedlacek .............................. | 34/57 A |
| 4,624,058 | 11/1986 | Nakayasu et al. ................... | 34/10 |
| 4,779,547 | 10/1988 | Zugner ................................. | 110/297 |
| 5,184,671 | 2/1993 | Alliston et al. ...................... | 165/104.16 |
| 5,251,384 | 10/1993 | Olsen et al. ......................... | 34/82 |
| 5,286,188 | 2/1994 | Barkley ................................ | 431/170 |
| 5,354,039 | 10/1994 | Takenoshita et al. ............... | 266/251 |
| 5,391,356 | 2/1995 | Thorman .............................. | 422/143 |
| 5,401,471 | 3/1995 | Scheler et al. ....................... | 422/143 |
| 5,575,086 | 11/1996 | Hartman et al. ..................... | 34/585 |
| 5,836,257 | 11/1998 | Belin et al. .......................... | 110/245 |

Primary Examiner—Pamela A. Wilson
Assistant Examiner—Andrea M. Joyce
Attorney, Agent, or Firm—Myers Bigel Sibley & Sajovec

[57] ABSTRACT

A particle movement controller, being disposed between a first fluidized bed, to where particles are supplied, and a second fluidized bed, from where particles are discharged, which controls the moving amount of the particles from the first fluidized bed to the second fluidized bed, is improved to have a substantially proportional characteristic without a hysteresis. Flow rate control nozzle pipes $30a, 30b, \ldots, 30j$ made of horizontal pipes are disposed vertically at intervals and nozzle holes 31 are formed in a lower surface of each of the nozzles. An amount of air emitted from each nozzle hole 31 is controlled using opening and closing valves $33a, 33b, \ldots, 33j$ or flow rate adjustment valves $35a, 35b, \ldots, 35j$ (FIG. 2).

14 Claims, 14 Drawing Sheets

PARTICLE MOVEMENT AMOUNT CONTROLLER FOR FLUIDIZED BEDS

FIELD OF THE INVENTION AND RELATED ARTS

The present invention relates to a particle flow movement amount controller, which controls a movement amount of particles in a fluidized bed, using a non-mechanical method.

Figure 11:
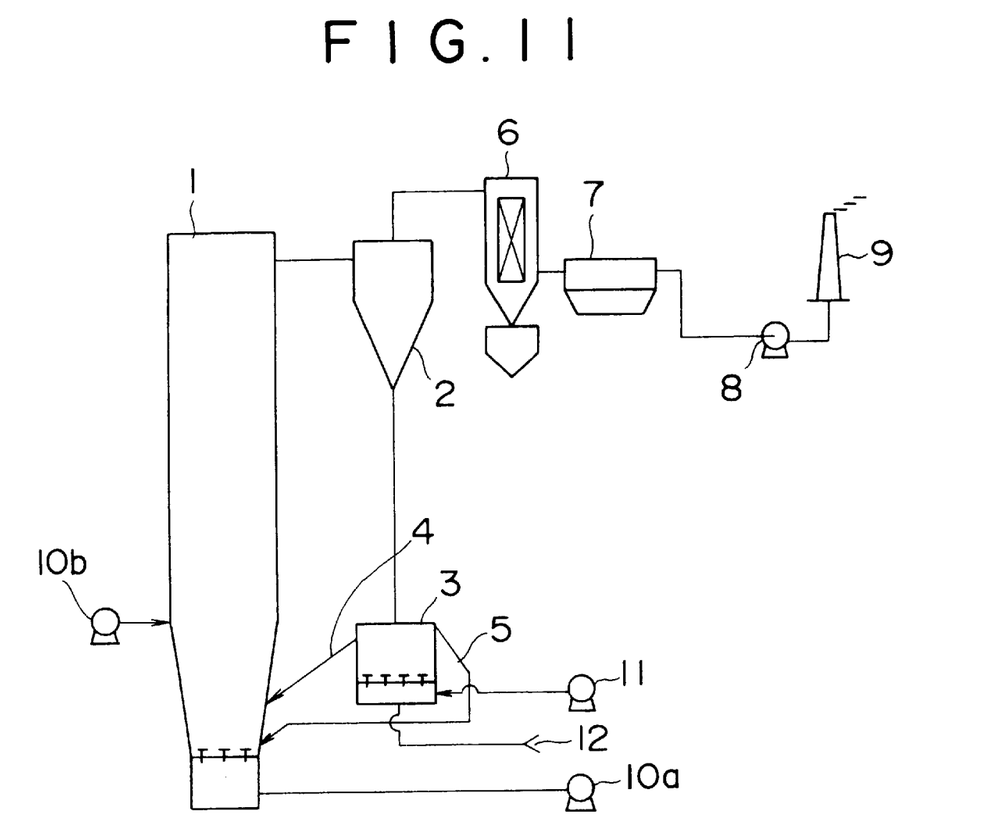
FIG. 11 is a schematic diagram illustrating a circulating fluidized bed boiler which is a solid gas reaction apparatus provided with a particle movement amount controller.

FIG. 11 is a schematic diagram illustrating a boiler having a circulatory fluidized bed. Such boiler is a typical example of a solid-gas reaction apparatus which requires a control of flow movement amount of particles.

As shown in FIG. 11, the boiler with a circulating fluidized bed has a combustor 1, in which a high-speed fluidized bed is formed and a combustion is carried out therein.

Particles and gas, which form a high-speed fluidized bed in the combustor 1, move from the combustor 1 to a cyclone 2. The particles separated therefrom are led to a particle circulation control unit 3. A part of the separated particles returns to the combustor 1 via a hot recycle system 4, without being cooled. And the other part of the particles is cooled by its vaporization or some heat exchange, and will be returned to the combustor 1 through a cold recycle system 5.

The gas exited from the cyclone 2 is heat-exchanged at a convection heat transmission surface 6, then passes through a bag filter 7, suction draft fan 8 and chimney 9, and will be finally discharged to the atmosphere.

Air necessary for combustion is fed from blowers 10a and 10b. On the other hand, air necessary for control of circulation of particles is fed from a blower 11 and air supply source 12.

Figure 12:
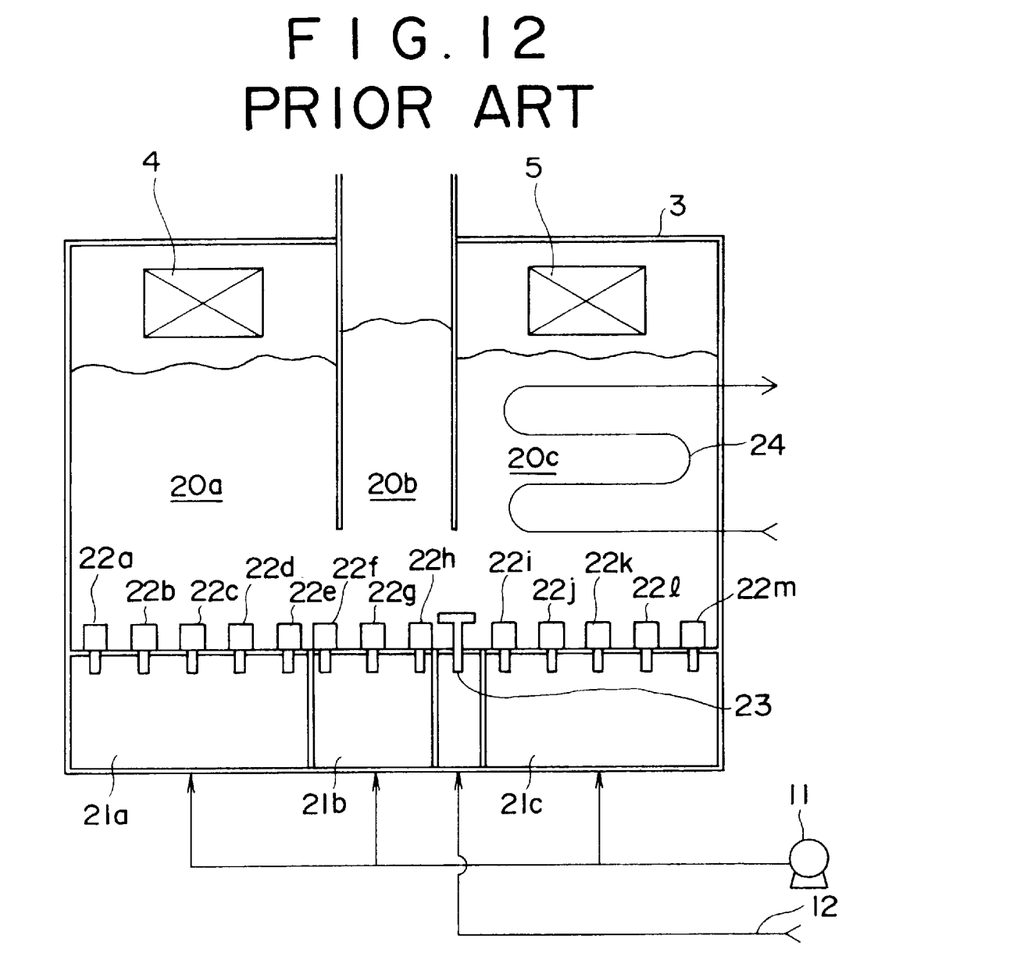
FIG. 12 is a sectional view schematically illustrating a particle circulation control unit in a prior art.

FIG. 12 is a sectional view schematically illustrating the particle circulation control unit 3 in a prior art.

The inside of the particle circulation control unit 3 is separated into three fluidized beds 20a, 20b and 20c, in which air from the blower 11 is provided from wind boxes 21a, 21b and 21c through nozzles 22a, . . . , 22m. The fluidized beds 20a, 20b and 20c are driven by this air.

The particles separated by the cyclone 2 (not shown in FIG. 12) enter into the fluidized bed 20b. A part thereof circulates directly, without being cooled, through the fluidized bed 20a and the hot recycle system 4 to the combustor 1 (not shown in FIG. 12).

Other part of the particles enter into the fluidized bed 20c through the fluidized bed 20b and are cooled at a heat transmission surface 24. After the temperature of the particles has fallen, the particles are circulated through the cold recycle system 5 to the combustor 1.

The amount of particles flowing in the cold recycle system 5 is controlled, in turn, by a flow rate control nozzle 23, which is controlled by air fed from the air supply source 12.

Figure 13:
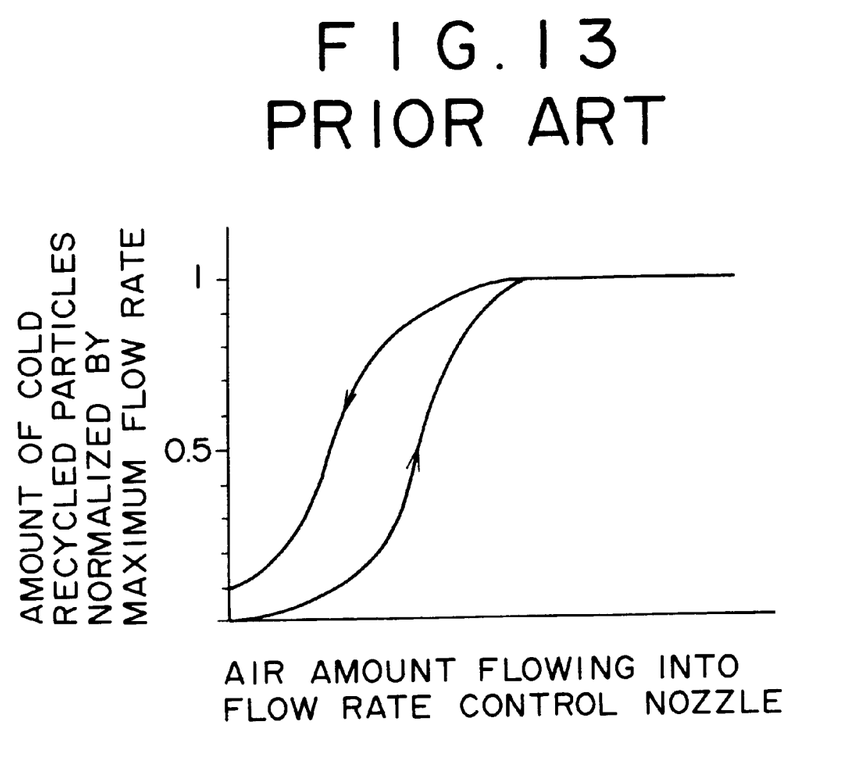
FIG. 13 is a graph showing the relation of an amount of particles flowing in a cold recycle system and an amount of air flowing in a flow rate control nozzle in a particle movement amount controller in a prior art.

FIG. 13 shows a relation of the amount of particles flowing in the cold recycle system 5 and the amount of air flowing through the flow rate control nozzle 23 in the conventional structure. The following can be understood from the curves shown in FIG. 13.

(i) The relation of the amount of air flowing through the flow rate control nozzle and the cold recycle amount of particles is non-linear and rises abruptly.

(ii) When the amount of flowing air is small, the circulation of particles does not begin.

(iii) There is a hysteresis characteristics. Namely, even when the amount of air flowing in the control nozzle becomes zero, the circulation of particles will not stop, or it takes a lag time until the flowing stops.

The above characteristics causes many problems in operation of the apparatus, for example, in a case of a boiler, the combustion temperature and/or the vaporization amount fluctuate. These phenomena can be explained as follows.

Figure 14:
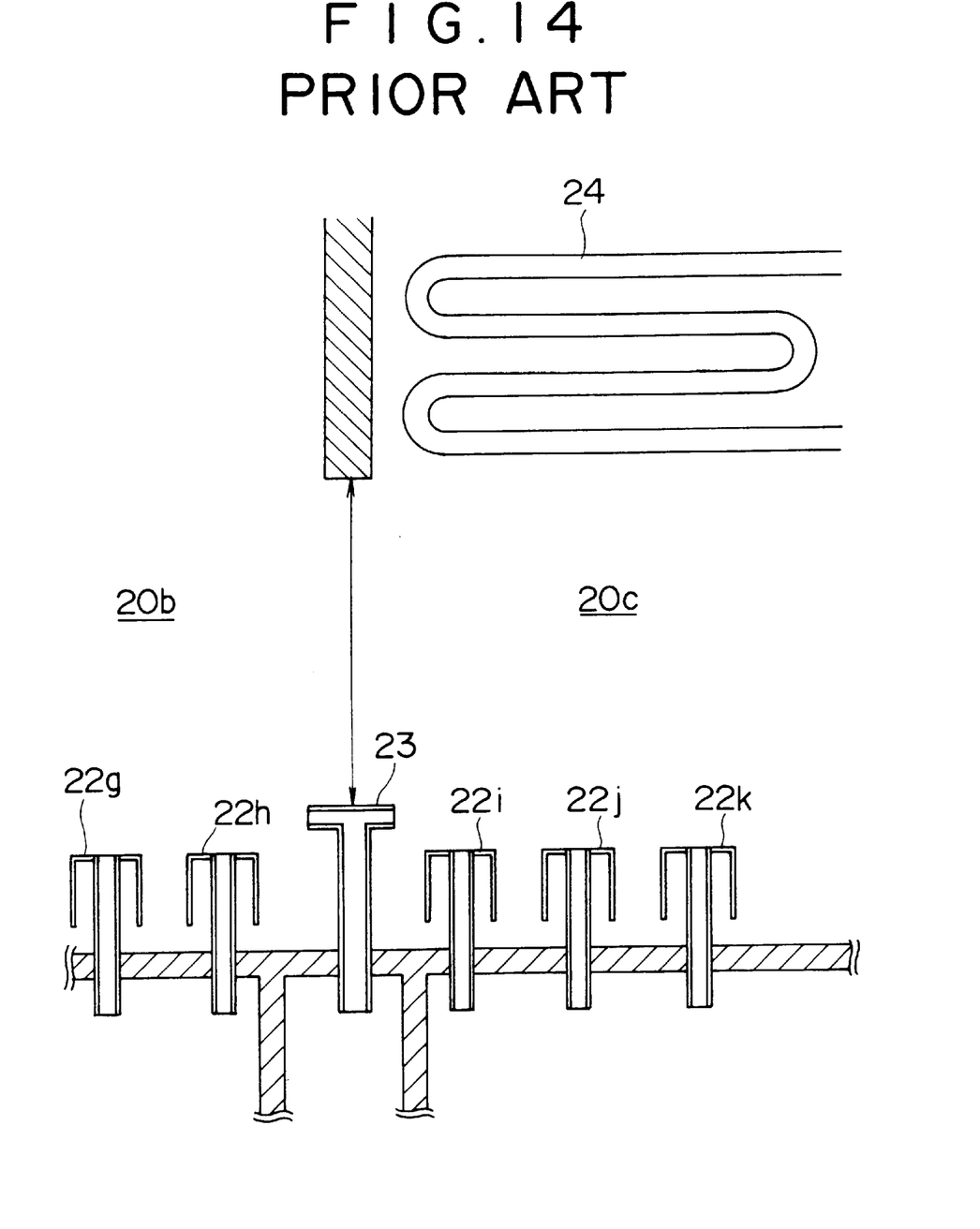
FIG. 14 is a sectional view schematically illustrating the periphery of a flow rate control nozzle in a prior art.

FIG. 14 is a detailed sectional view schematically illustrating the periphery of the flow rate control nozzle of the prior art.

The above problems in operation are caused by the reason that a "height L of an opening" between the flow rate control nozzle 23 and a partition wall is large. Thus the change of the amount of air flowing in the flow rate control nozzle 23 cannot precisely control the movement of particles from the fluidized bed 20b to the fluidized bed 20c.

OBJECTS AND SUMMARY OF THE INVENTION

It is an object to provide a particle movement amount controller having a substantially proportional relation, without any hysteresis, between the amount of air flowing in a flow rate control nozzle and the movement amount of particles.

According to the present invention the above problem is solved by a particle movement controller for fluidized beds which controller is disposed between a first fluidized bed to which particles are supplied and a second fluidized bed from which particles are discharged for controlling the amount of particles moving from the first fluidized bed to the second fluidized bed, characterized in that the flow rate of particles between the adjacent fluidized beds is controlled by flow rate control nozzle pipes which are disposed one over another as rungs of a ladder in a region between the fluidized beds;

that the vertical gaps or spaces between the rungs are determined so that the pipes function as a resistor against the flow of particles; and that the resistance is controlled by the amount of air blown out from the nozzle holes which are formed on the nozzle pipes, preferably, on the under side of the nozzle pipes.

In this manner, the control of the particle flow rate between the two adjacent fluidized beds can be improved without mechanical means.

More particularly, the above problems are solved, according to the present invention, by a particle movement controller which is disposed between a first fluidized bed to which particles are supplied and a second fluidized bed from which particles are discharged for controlling the amount of the particles moving from the first fluidized bed to the second fluidized bed, said controller comprising flow rate control nozzles, comprising:

flow rate control nozzles formed with a plurality of flow control pipes disposed substantially horizontally one over another like rungs of a ladder with certain intervals in a boundary region between adjacent fluidized beds;

nozzle holes opened on the nozzle pipes, preferably, on the under side of the nozzle pipes;

a gas supplier for supplying a gas to be blown out from the nozzle holes; and a blown-out gas amount controller for controlling the amount of the gas blown out from the nozzle holes.

The following effects are obtained by the present invention.

(1) The flow rate of particles moving between the adjacent fluidized beds can be controlled by a non-mechanical method.

(2) The hysteresis characteristic in the flow rate control is eliminated.

(3) The flow rate of moving particles can be reduced to zero exactly when necessary.

(4) Even when the fluidized bed is rather thick or when the fluidized bed is rather thin, the flow rate can be controlled exactly.

DETAILED DESCRIPTION OF PREFERRED EMBODIMENTS

Figure 1:
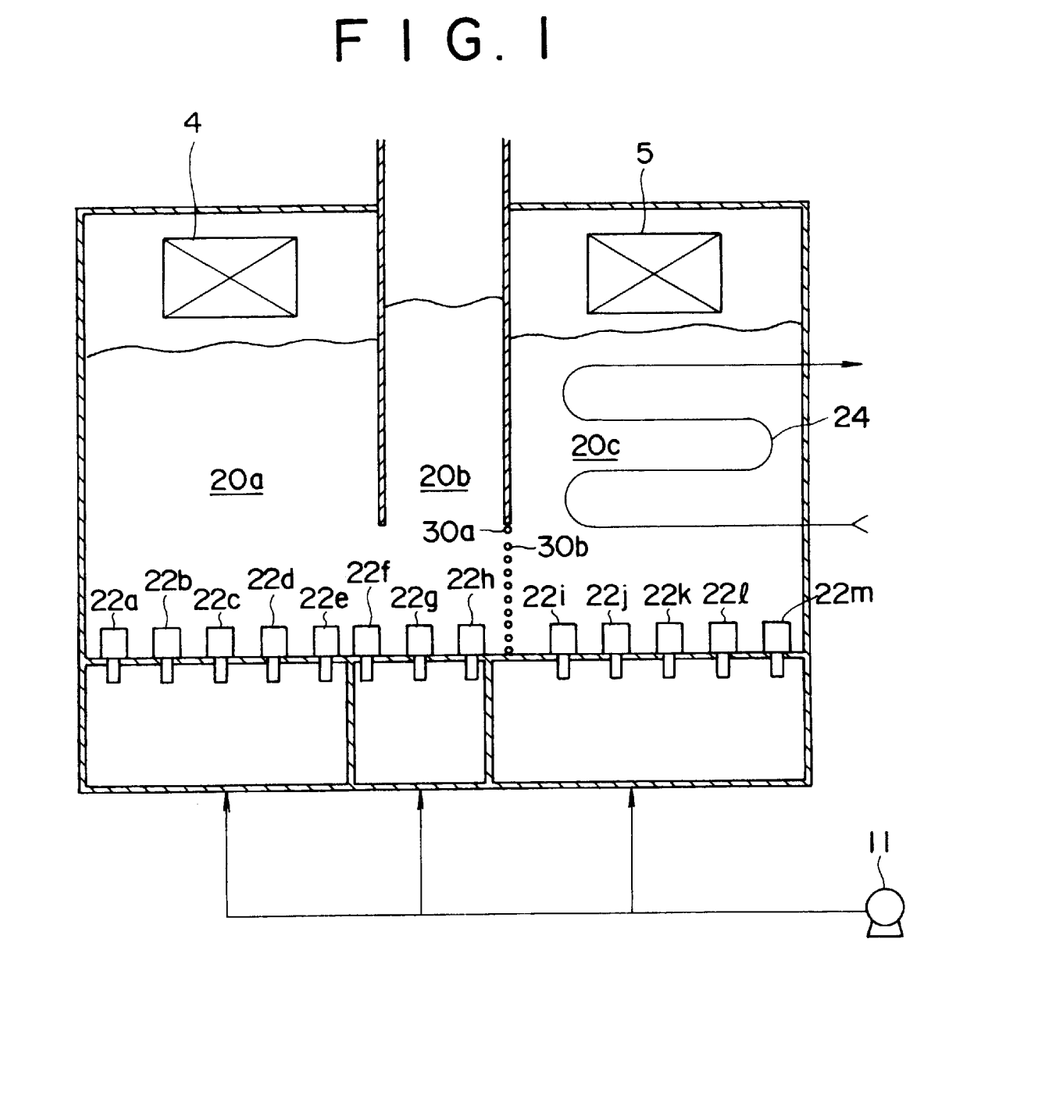
FIG. 1 is a sectional view schematically illustrating a particle circulation control unit including a particle movement amount controller according to the present invention.

FIG. 1 is a sectional view schematically illustrating a particle circulation control unit having a particle movement amount controller according to the present invention. The particle movement amount controller includes a plurality of flow rate control nozzle pipes $30a$, $30b$, . . . , $30j$ made of horizontal pipes disposed to be overlapped with one another vertically at intervals, in place of the flow rate control nozzle 23 of the conventional particle circulation control unit shown in FIG. 12. The other elements are the same as those of FIG. 12. Same reference numerals are given to the corresponding elements in both of the drawings, and description thereof is omitted.

Figure 2:
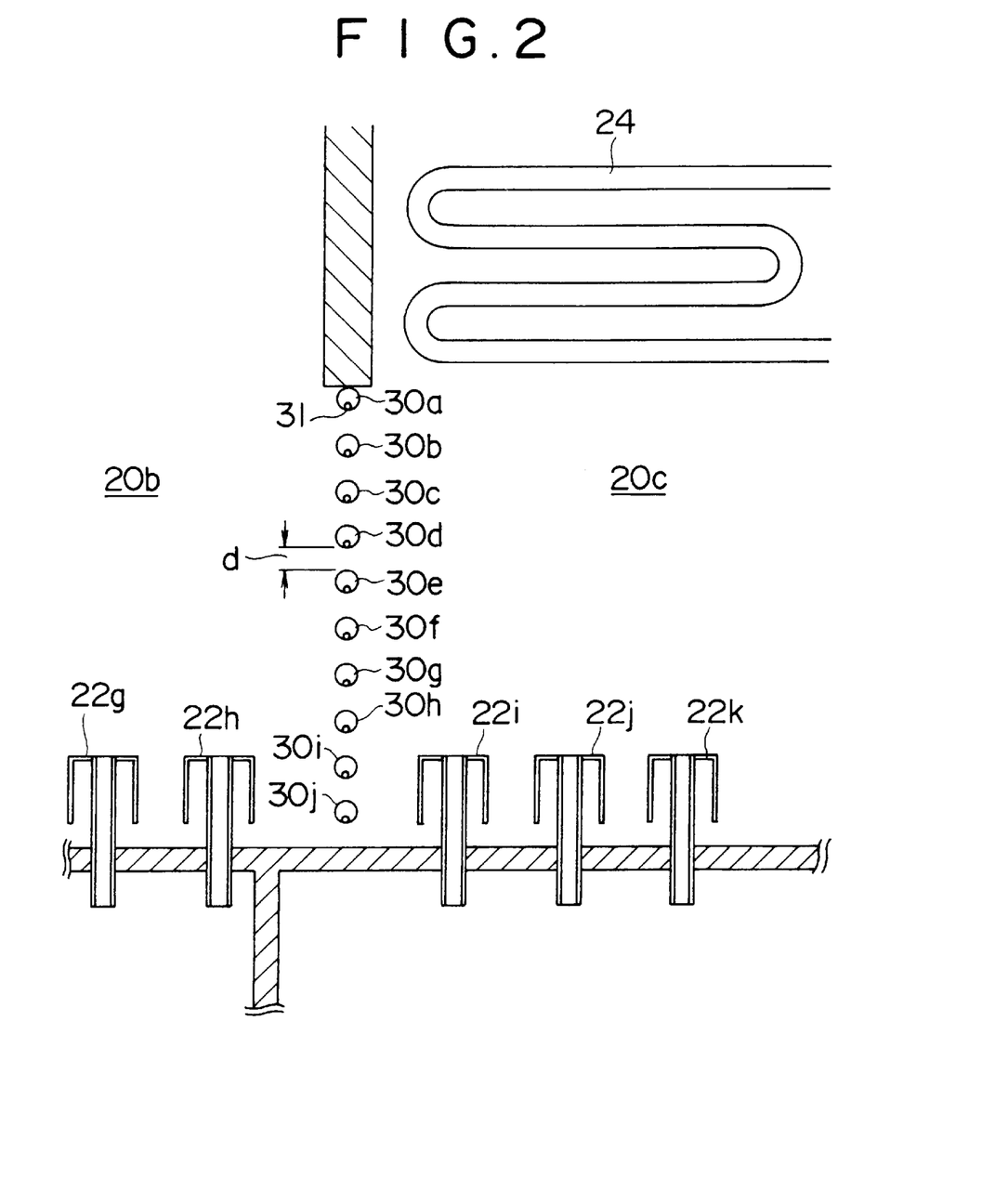
FIG. 2 is a partially enlarged view of the particle movement amount controller of FIG. 1.

FIG. 2 is a partially enlarged view of the particle movement amount controller of FIG. 1. The flow rate control nozzle pipes $30a$, $30b$, . . . , $30j$ are disposed horizontally between the fluidized beds $20b$ and $20c$, perpendicularly to this drawing, and each of the nozzle pipes has an air emission hole (nozzle hole) 31 at the lower surface of the nozzle pipe.

The length d of a vertical gap or space between the flow rate control nozzle pipes $30a$, $30b$, . . . , $30j$ can be set to any value. In the example of FIG. 2, the length d is set to be nearly equal to a diameter of the flow rate control nozzle pipe. The length d is mainly determined on the basis of the value of a dynamic physical property of particles, such as, for example, a value named an angle of repose.

Figure 3:
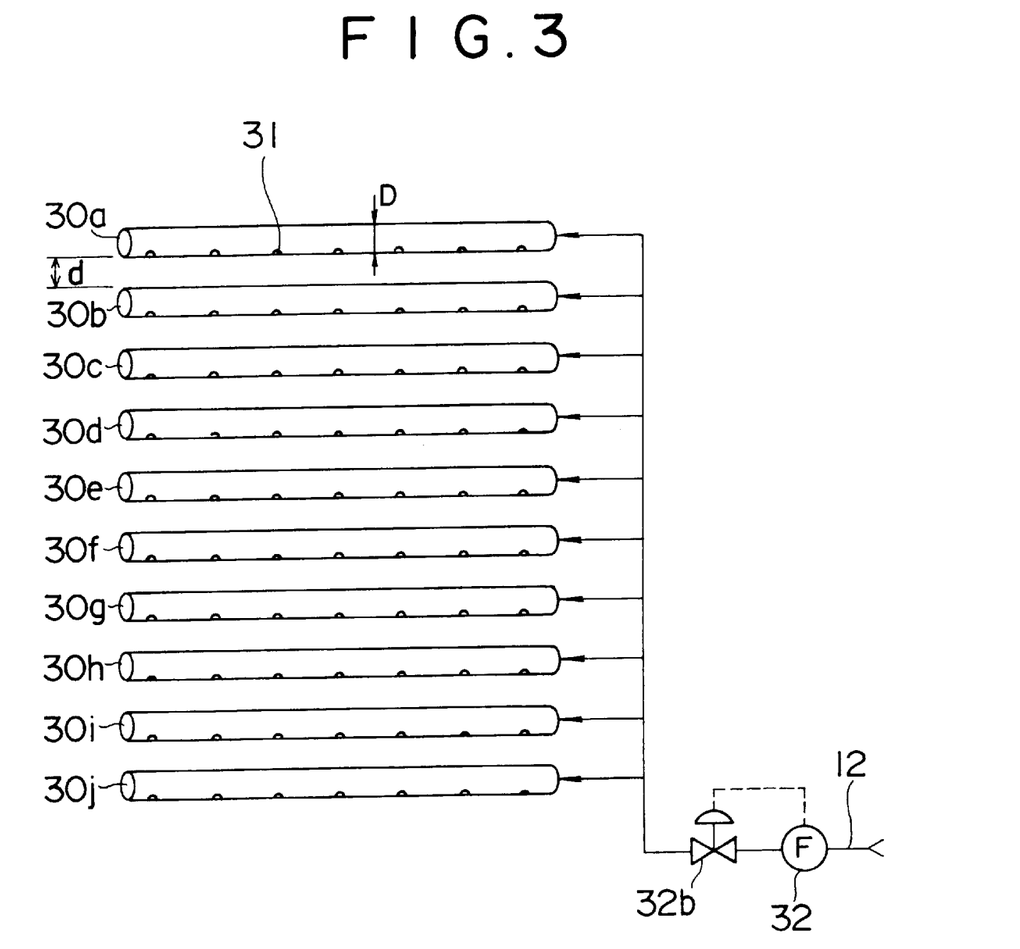
FIG. 3 is a side view illustrating a first embodiment of an arrangement of flow rate control nozzles and a piping system of the particle movement amount controller of FIGS. 1 and 2.

FIG. 3 shows a first embodiment of a piping system of the flow rate control nozzle pipes $30a$, $30b$, . . . , $30j$. Air from the common air supply source 12 goes through a flowmeter 32 and a flow rate adjustment valve $32b$ and enters into the flow rate control nozzle pipes $30a$, $30b$, . . . , $30j$. The size and arrangement of the emission holes (nozzle hole) 31 opened in the flow rate control nozzle pipes are designed, considering the characteristics of the plant to be applied, for example, a combustion plant, and the amount of air flowing through the nozzle holes, to have a proper pressure loss.

Since the diameter D of the flow rate control nozzle pipes $30a$, $30b$, . . . , $30j$ and the space d formed therebetween is small (generally d/D<10), particles in the fluidized bed $20b$ hardly move to the fluidized bed $20c$, unless the particles therebetween are positively driven to move.

When air is fed into the flow rate control nozzle pipes $30a$, $30b$, . . . , $30j$ and emitted from the nozzle holes to the spaces between the nozzle pipes, particles become possible to move from the fluidized bed $20b$ to the fluidized bed $20c$, and particles moved into the fluidized bed $20c$ circulates through the cold recycle system 5 to the combustor 1. The flow rate control nozzle pipes $30a$, $30b$, . . . , $30j$ disposed between the fluidized beds $20b$ and $20c$ serve as a controllable resistor against the fluidized beds forming particles.

Figure 4:
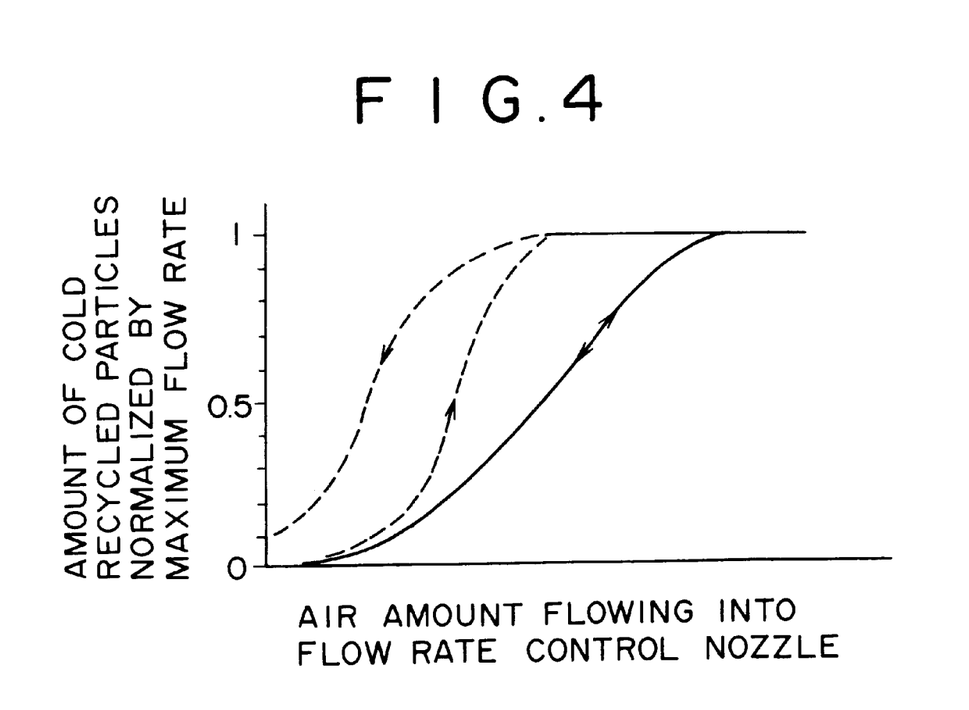
FIG. 4 is a characteristic curve diagram showing comparison of a characteristic (solid line) of the particle movement amount controller of FIG. 1 and a characteristic (broken line) of the particle movement amount controller of FIG. 14 in a prior art.

FIG. 4 shows the particle circulation control curves according to the present invention in comparison with the prior art. The amount of flowing air itself is greater than conventional combustors, to use the flow rate control nozzle pipes functions as a controllable resistors. However the relation between the amount of air flowing in the flow rate control nozzle pipes and the amount of the cold recycled particles becomes smoother compared to the conventional combustors. And the hysteresis, in which the cold recycled amount of particles at the increasing phase of air supply is different from the decreasing phase of air supply, is dissolved.

Figure 5:
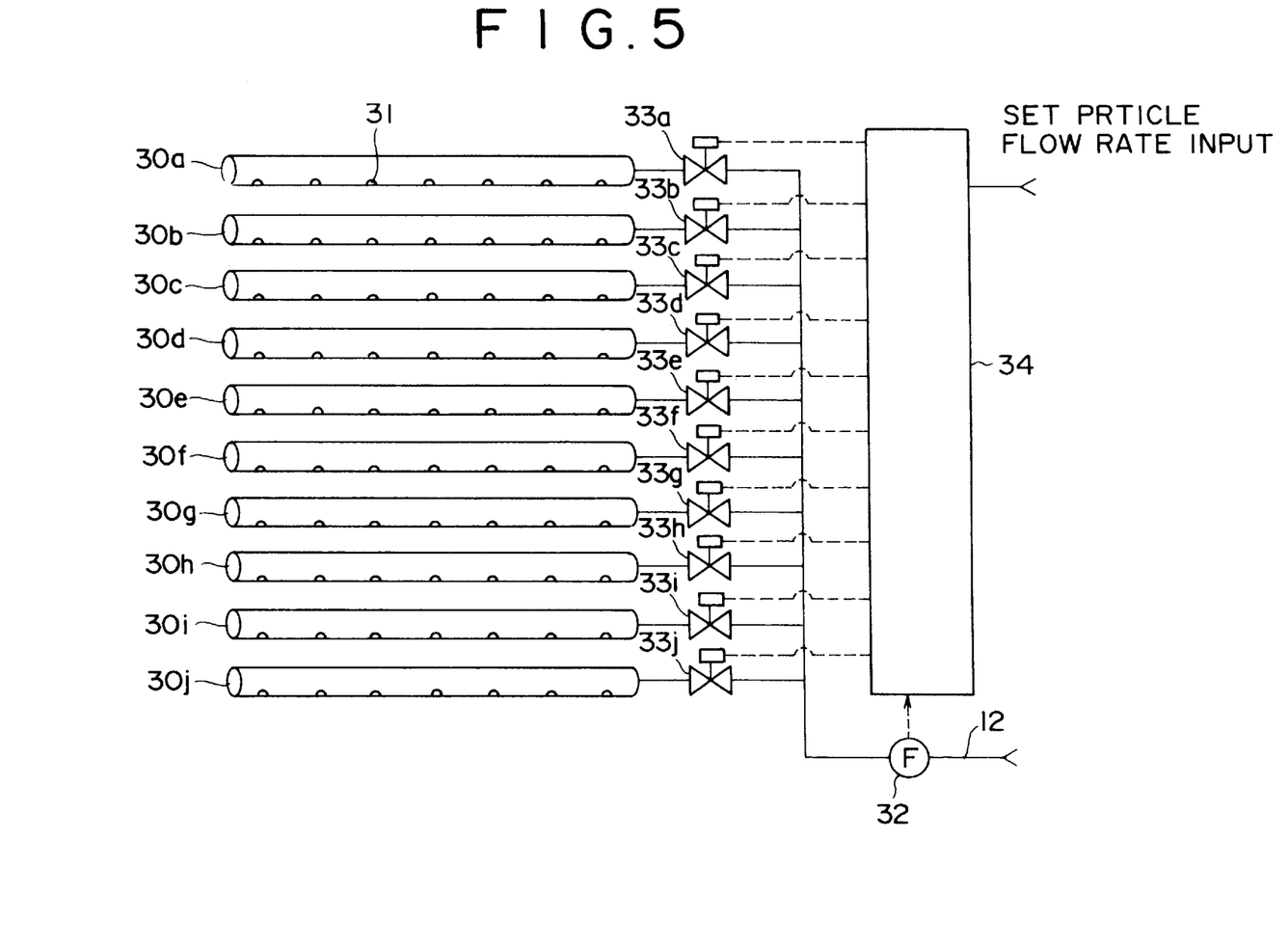
FIG. 5 is a side view illustrating a second embodiment of an arrangement of flow rate control nozzles and a piping system of the particle movement amount controller according to the present invention.
Figure 6:
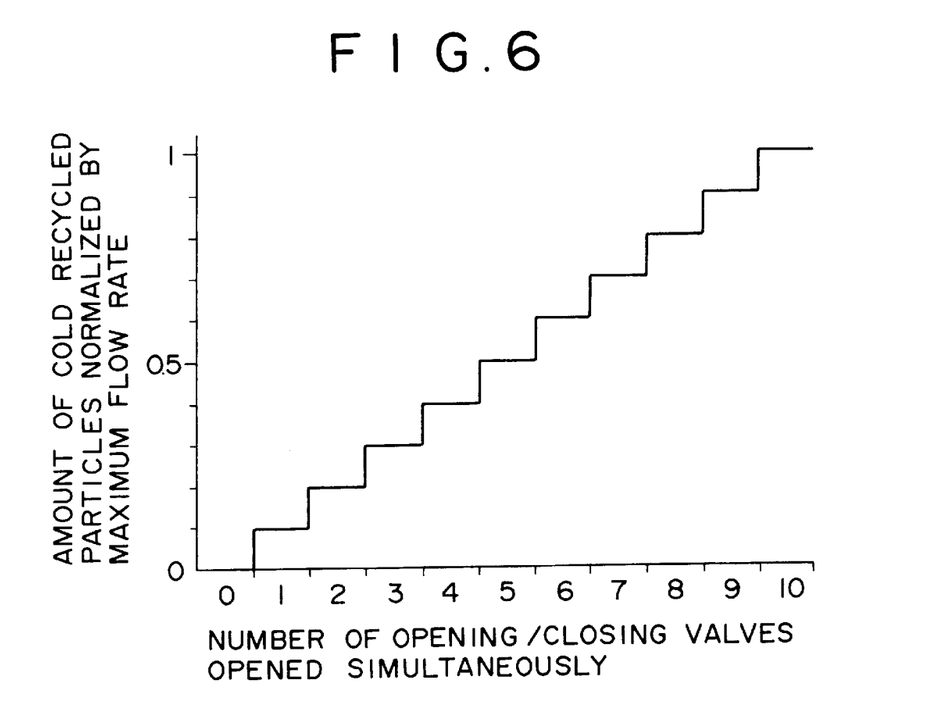
FIG. 6 shows a particle circulation control characteristic in the embodiment of FIG. 5, in which the abscissa axis represents the number of valves opened simultaneously and the ordinate axis represents the cold recycle amount of particles normalized by a maximum flow rate.

FIG. 5 is a side view schematically illustrating a second embodiment of an arrangement of flow rate control nozzle pipes and a piping system of the particle movement amount controller according to the present invention and FIG. 6 shows a particle circulation control characteristic in the embodiment of FIG. 5.

In the embodiment, a mechanism for supplying and stopping the air flow through the flow rate control nozzle pipes is provided, so that simultaneously the operation of a plurality of flow rate control nozzle pipes can be changed in accordance with a target value of the flow rate of particles.

The main structure of the embodiment is the same as the first embodiment. Air from the air supply source 12 is fed through the flowmeter 32 and opening and closing valves 33*a*, 33*b*, . . . , 33*j* and enters into the flow rate control nozzle pipes 30*a*, 30*b*, . . . , 30*j*.

A controller 34 is supplied with a set particle flow rate input and an output of the flowmeter 32 to control the opening and closing valves 33*a*, 33*b*, . . . , 33*j*.

In the embodiment, arbitral part of the flow rate control nozzle pipes 30*a*, 30*b*, . . . , 30*j* can be opened in response to the target particle flow rate input of the target. The ladder-like flow rate control nozzle pipes 30*a*, 30*b*, . . . , 30*j* serve as controllable resistor against the flow of particles. Particles existing near to the flow rate control nozzle pipes in which air does not flow hardly move.

An example of the relation of the number of the air flowing flow rate control nozzle pipes (the number of the open valves) and the amount of cold recycled particles is shown in FIG. 6. Control in this method can be called as a step control. In other words, according to the number of the open air flowing flow rate control nozzle pipes, the amount of cold recycled particles changes stepwise.

Figure 7:
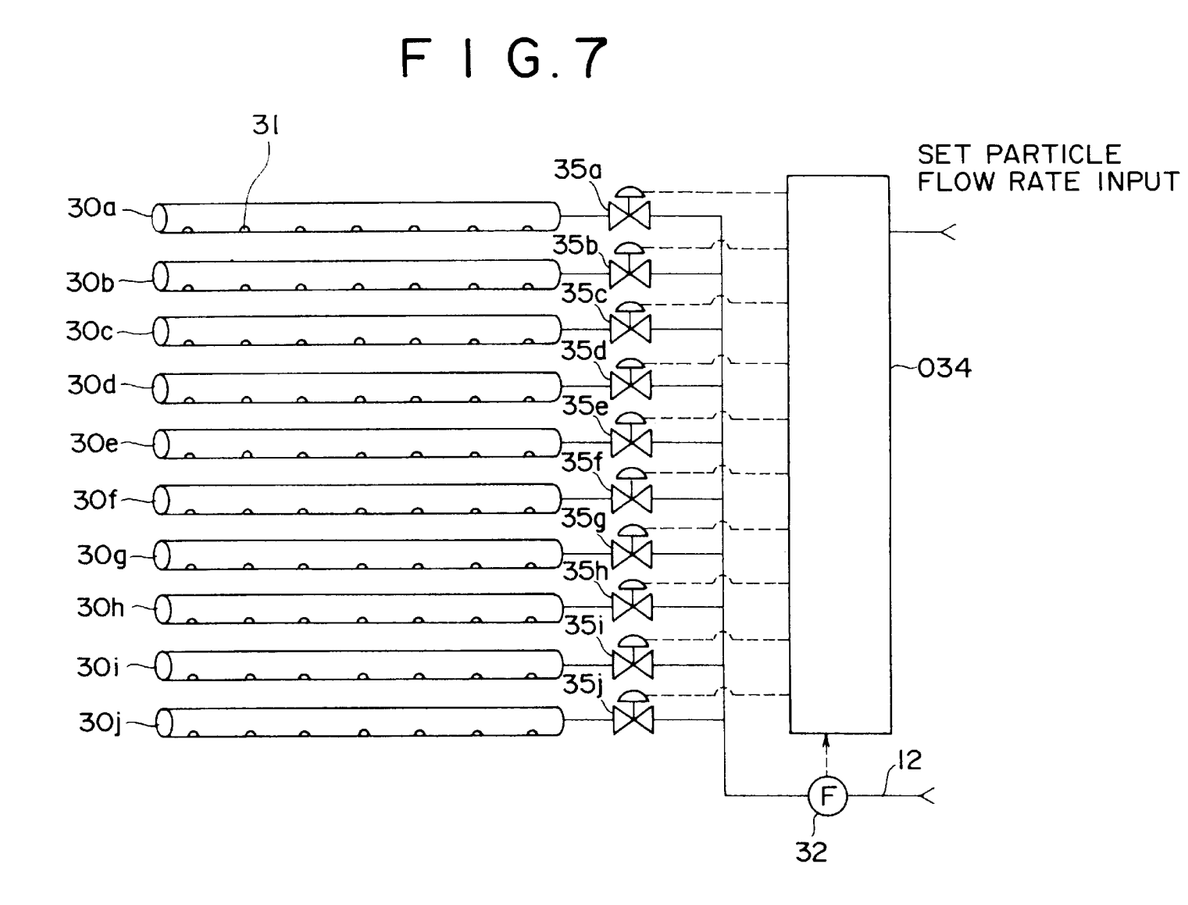
FIG. 7 is a side view illustrating a third embodiment of an arrangement of flow rate control nozzle pipes and a piping system of the particle movement amount controller according to the present invention.

FIG. 7 is a side view schematically illustrating a third embodiment of an arrangement of flow rate control nozzle pipes and a piping system of the particle movement amount controller according to the present invention.

The embodiment includes a mechanism for supplying and stopping the air flow in the flow rate control nozzle pipes and an adjustment mechanism for setting an amount of air to any value. The number of the flow rate control nozzle pipes can be changed and at the same time the amount of air flow through the nozzle pipes can be changed.

The main structure of the embodiment is same to the first embodiment. Air from the air supply source 12 is fed through the flowmeter 32 and flow rate adjustment valves 35*a*, 35*b*, . . . , 35*j* and enters into the flow rate control nozzle pipes 30*a*, 30*b*, . . . , 30*j*. The controller 34 is supplied with a set particle flow rate input and the output of the flowmeter 32 to control the flow rate adjustment valves 35*a*, 35*b*, . . . , 35*j*.

In the embodiment, the target particle flow rate input is realized, by a combination of the operation to open only a part of the flow rate control nozzle pipes 30*a*, 30*b*, . . . , 30*j* and the operation to change the amount of gas fed to the open flow rate adjustment valves 35*a*, 35*b*, . . . , 35*j*. As a result, in addition to the particle flow rate control by the on/off control described in the second embodiment, the amount of gas flowing in the flow rate control nozzle pipes is changed to vary smoothly the particle flow rate.

Figure 8:
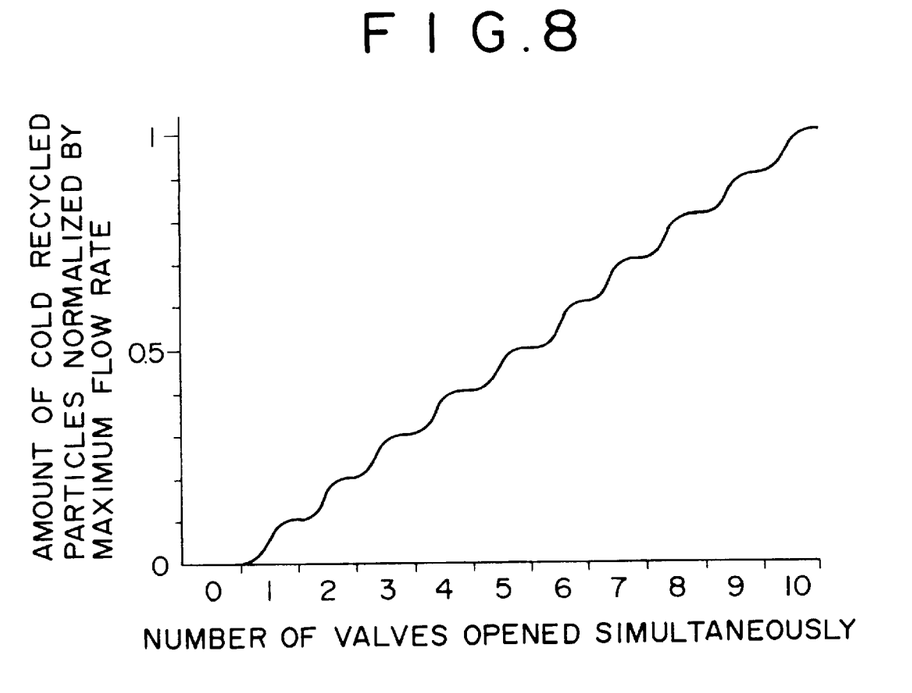
FIG. 8 shows a particle circulation control characteristic in the embodiment of FIG. 7, in which the abscissa axis represents the number of valves opened simultaneously and the ordinate axis represents the cold recycle amount of particles normalized by a maximum flow rate.

FIG. 8 shows the relation between the number of valves opened simultaneously and the amount of cold recycled particles in the embodiment. As apparent from FIG. 8, a smoother control is attained as compared with a system using only an opening and closing valves.

In the present embodiment, the air amount through the open flow rate adjustment valves 35*a*, 35*b*, . . . , 35*j* and the total air amount through the whole of the flow rate control nozzle pipes 30*a*, 30*b*, . . . , 30*j* are substantially proportional. The more the amount of cold recycled particles is, the more the flow rate of air is.

Figure 9:
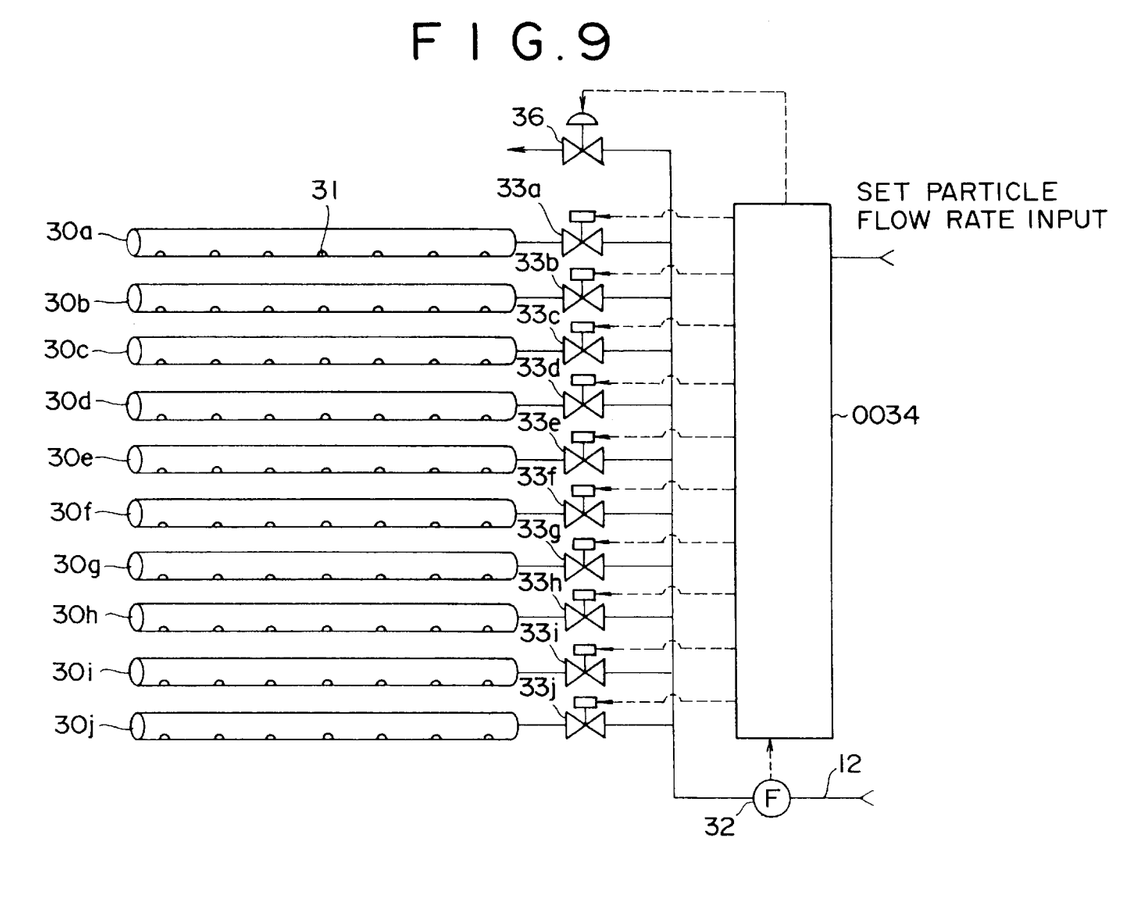
FIG. 9 is a side view illustrating a fourth embodiment of an arrangement of flow rate control nozzles and a piping system of the particle movement amount controller according to the present invention.

FIG. 9 is a side view schematically illustrating a fourth embodiment of an arrangement of the flow rate control nozzle pipes and a piping system.

Operation of this embodiment is same to the second embodiment, except that the air amount used for the circulation control of particles can be made constant irrespective of the particle circulation amount.

Air from the air supply source 12 is fed through the flowmeter 32, the opening and closing valves 33*a*, 33*b*, . . . , 33*j* and enters into the flow rate control nozzle pipes 30*a*, 30*b*, . . . , 30*j*. A bypassing flow rate adjustment valve 36 is connected to an outlet side of the flowmeter 32. The outlet side of the bypassing flow rate adjustment valve 36 is connected to an upper portion of the particle circulation control unit 3 (not shown).

A set particle flow rate input and the output of the flowmeter 32 are given to the controller 0034. It controls the opening and closing of the opening and closing valves 33*a*, 33*b*, . . . , 33*j* and the degree of the opening of the bypassing flow rate adjustment valve 36.

In the embodiment, the bypassing flow rate adjustment valve 36 can make constant the amount of air flowing in the apparatus (for example, the circulating fluidized-bed boiler), even if the number of the open valves 33*a*, 33*b*, . . . , 33*j* is changed.

According to the present embodiment, for example, in a boiler, a necessary amount of the oxygen tends to be constant, which may be caused by the change of the amount of cold recycled particles.

The concept of the control is as follows.

The controller 0034 decides the number of the valves 33*a*, 33*b*, . . . , 33*j* to be opened, on the basis of the amount of cold recycled particles, using a known function. The controller 0034 gets a total amount of air $Q_T$ which flows though the flow rate control nozzle pipes 30*a*, 30*b*, . . . , 30*j*, when all of the valves 33*a*, 33*b*, . . . , 33*j* are opened (in this state, the amount of cold recycled particles is maximum). The bypassing flow rate adjustment valve 36 is controlled so that the indication of the flowmeter 32 is always equal to the total amount $Q_T$.

The control of this embodiment can be applied to the third embodiment, too.

Figure 10:
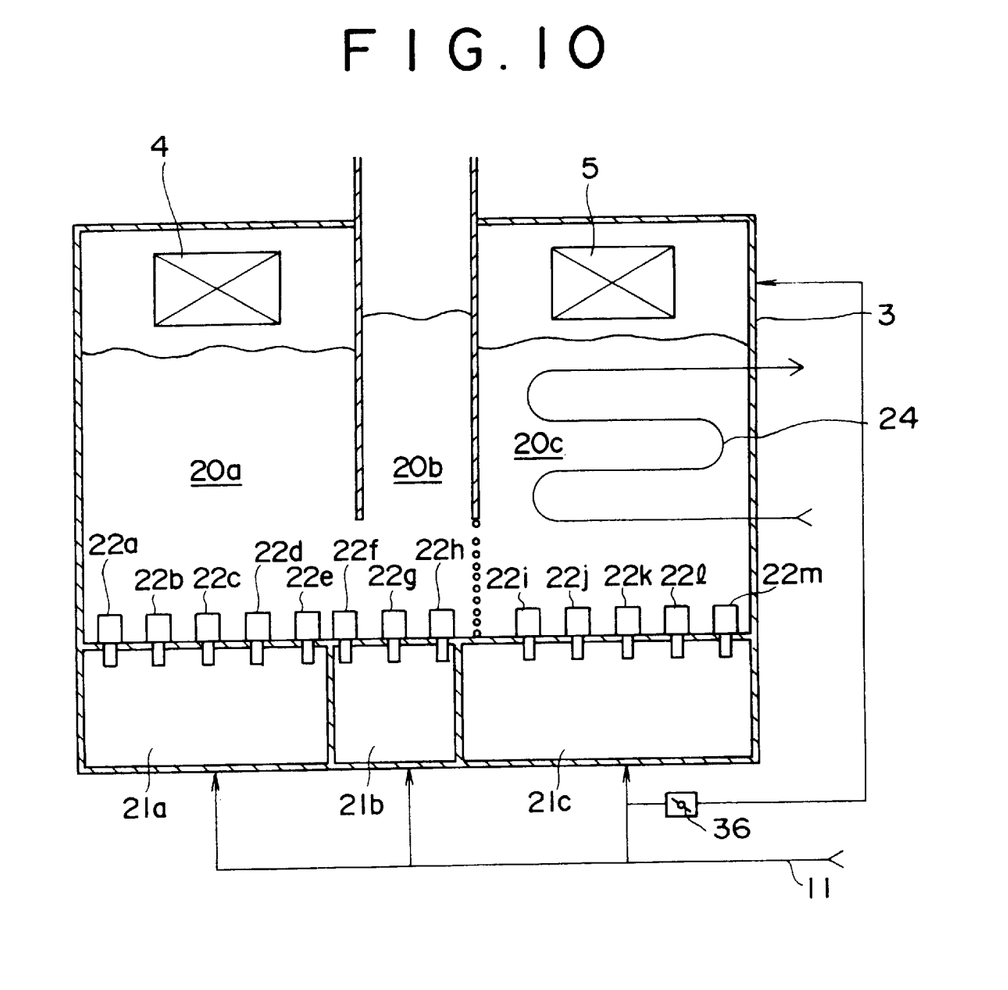
FIG. 10 is a sectional view illustrating a particle circulation control unit to which the fourth embodiment is applied.

FIG. 10 is a sectional view schematically illustrating the particle circulation control unit to which the embodiment is applied.

The main constituent elements are the same as the first embodiment.

A bypassing damper (bypassing flow rate adjustment valve) 36 is provided in an air system (connected to the wind box 21*c*) for forming the fluidized bed 20*c* on a side of the cold recycle system 5 and there is provided a mechanism for bypassing a part of air flowing in the wind box 21*c* to the upper portion of the particle circulation control unit 3.

This embodiment is mainly applied at moments of starting or stopping of the plant, for example, a combustion plant. A part of air flowing in a fluidized bed is bypassed to reduce the air velocity so as to stop the particle circulation between adjacent fluidized beds, In a circulating fluidized bed boiler, the combustion amount is small and the total circulation amount of particles is also small at the starting time. Accordingly, it is not necessary, in terms of the thermal balance of the boiler, to flow particles to the cold recycle system 5. However, since the total circulation amount of particles is small, the levels of the fluidized layers 20*a*, 20*b* and 20*c* are low, particularly the level of the fluidized bed 20c is low. Accordingly, if there is not provided a mechanical mechanism for closing a flow channel of particles, as in a prior art, following problems will arise and cannot be suppressed: particles from the fluidized bed 20b flow into the fluidized bed 20c, or heat will be absorbed at the transmission surface 24, while these shall not happen during the starting period.

On the contrary, in this embodiment, when it is desired to suppress movement of particles from the fluidized bed 20b to the fluidized bed 20c, for example, at the starting time, the bypassing damper (bypassing flow rate adjustment valve) 36 can be opened to reduce the air velocity of the fluidized bed 20c.

This embodiment can be applied to any of the first to third embodiments.

What is claimed is:

1. A particle movement amount controller for fluidized beds comprising a plurality of spaced flow rate control nozzle pipes which are disposed one over another as rungs of a ladder in a region between adjacent fluidized beds, and nozzle holes each formed in each of said flow rate control nozzle pipes to emit flowing gas.

2. A particle movement amount controller according to claim 1, wherein said flow rate control nozzle pipes are disposed at such intervals that said nozzle pipes resist movement of particles when the flowing gas is not emitted.

3. A particle movement amount controller according to claim 1, wherein the ratio of the spacing of the flow rate control nozzle pipes to their outer diameter is no greater than 10.

4. A particle movement amount controller according to claim 2, wherein the ratio of the spacing of the flow rate control nozzle pipes to their outer diameter is no greater than 10.

5. A particle movement amount controller according to claim 1, comprising a flow rate adjustment valve disposed in a pipe for supplying the flowing gas to said flow rate control nozzle pipes.

6. A particle movement amount controller according to claim 4, comprising a flow rate adjustment valve disposed in a pipe for supplying the flowing gas to said flow rate control nozzle pipes.

7. A particle movement amount controller according to claim 5, wherein said flow rate adjustment valve is disposed in each of inlet pipes of said flow rate control nozzle pipes.

8. A particle movement amount controller according to claim 6, wherein said flow rate adjustment valve is disposed in each of inlet pipes of said flow rate control nozzle pipes.

9. A particle movement amount controller according to claim 1, comprising ON/OFF valves disposed in inlet pipes of said flow rate control nozzle pipes.

10. A particle movement amount controller according to claim 1, comprising a branch pipe which branches from a pipe for supplying the flowing gas and which is connected to a space above said fluidized bed into which particles are moving from another fluidized bed, and a flow rate adjustment valve disposed in said branch pipe.

11. A particle movement amount controller according to claim 8, comprising a branch pipe which branches from a pipe for supplying the flowing gas and which is connected to a space above said fluidized bed into which particles are moving from another fluidized bed, and a flow rate adjustment valve disposed in said branch pipe.

12. A particle movement amount controller according to claim 1, further comprising a branch flow passage branching from a flow passage for supplying flowing gas to a lower portion of a first fluidized bed into which particles are moved from a second fluidized bed wherein said branch flow passage is connected to a space above said first fluidized bed, and a flow rate adjustment damper is disposed in said branch flow passage.

13. A particle movement controller for fluidized beds which controller is disposed between a first fluidized bed to which particles are supplied and a second fluidized bed from which particles are discharged for controlling the amount of particles moving from the first fluidized bed to the second fluidized bed, characterized in that the flow rate of particles between the adjacent fluidized beds is controlled by flow rate control nozzle pipes which are disposed one over another as rungs of a ladder in a region between the fluidized beds;

the vertical gaps or spaces between the rungs are determined so that the pipes function as a resistor against the flow of particles; and the resistance is controlled by the amount of air blown out from the nozzle holes which are formed on the nozzle pipes, preferably, on the under side of the nozzle pipes.

14. A particle movement controller for fluidized beds which controller is disposed between a first fluidized bed to which particles are supplied and a second fluidized bed from which particles are discharged for controlling the amount of the particles moving from the first fluidized bed to the second fluidized bed, said controller comprising flow rate control nozzles, comprising:

flow rate control nozzles formed with a plurality of flow control pipes disposed substantially horizontally one over another like rungs of a ladder with certain intervals in a boundary region between adjacent fluidized beds;

nozzle holes opened on the nozzle pipes, preferably, on the under side of the nozzle pipes;

a gas supplier for supplying a gas to be blown out from the nozzle holes; and a blown-out gas amount controller for controlling the amount of the gas blown out from the nozzle holes.

* * * * *